United States Patent
Luquet

(10) Patent No.: US 9,554,065 B2
(45) Date of Patent: Jan. 24, 2017

(54) IMAGE CAPTURE WITH ADDITION OF ACCUMULATION SIGNALS FOR ADJACENT PHOTODETECTORS

(71) Applicant: Airbus Defence and Space SAS, Les Mureaux (FR)

(72) Inventor: Philippe Luquet, Colomiers (FR)

(73) Assignee: Airbus Defence and Space SAS, Les Mureaux (FR)

( * ) Notice: Subject to any disclaimer, the term of this patent is extended or adjusted under 35 U.S.C. 154(b) by 0 days.

(21) Appl. No.: 14/786,487

(22) PCT Filed: Apr. 22, 2014

(86) PCT No.: PCT/FR2014/050963
§ 371 (c)(1),
(2) Date: Oct. 22, 2015

(87) PCT Pub. No.: WO2014/174195
PCT Pub. Date: Oct. 30, 2014

(65) Prior Publication Data
US 2016/0073045 A1  Mar. 10, 2016

(30) Foreign Application Priority Data

Apr. 25, 2013 (FR) .................................. 13 00966

(51) Int. Cl.
*H04N 5/347* (2011.01)
*H04N 5/369* (2011.01)
(Continued)

(52) U.S. Cl.
CPC ............ *H04N 5/347* (2013.01); *H04N 5/3692* (2013.01); *H04N 5/217* (2013.01); *H04N 5/357* (2013.01)

(58) Field of Classification Search
None
See application file for complete search history.

(56) References Cited

U.S. PATENT DOCUMENTS 5,812,190 A    9/1998  Audier et al.
6,215,522 B1 *  4/2001  Rouge ................. G01C 11/025
                                        348/145
(Continued)

FOREIGN PATENT DOCUMENTS

EP       0 738 074 A1    10/1996
WO   WO 2011/138541 A1   11/2011

OTHER PUBLICATIONS

PCT International Search Report and Written Opinion for PCT/FR2014/050963, mailed Jul. 11, 2014, 12 pgs.
(Continued)

*Primary Examiner* — Justin P Misleh
(74) *Attorney, Agent, or Firm* — Patterson Thuente Pedersen, P.A.

(57) ABSTRACT

An image capture instrument implements an addition of accumulation signals for photodetectors which are adjacent within a row of photodetectors. Segments are defined in the row with one and the same common length of segment, while being progressively offset by an offset length which is constant. The accumulation signals are added together for photodetectors which belong to one and the same segment. The offset length is less than the segment length, and greater than half said segment length. Artifacts in the image captured, which are due to spectrum aliasing, are thus decreased. The signal-to-noise ratio of the image is increased.

11 Claims, 2 Drawing Sheets

(51) Int. Cl.
  *H04N 5/217*  (2011.01)
  *H04N 5/357*  (2011.01)

(56) References Cited

U.S. PATENT DOCUMENTS

| | | | |
|---|---|---|---|
| 6,493,021 B1* | 12/2002 | Rouge | G01C 11/025 |
| | | | 348/145 |
| 7,268,814 B1 | 9/2007 | Pain et al. | |
| 9,055,240 B2 | 6/2015 | Brouard et al. | |
| 2003/0076434 A1 | 4/2003 | Karasawa | |
| 2010/0328505 A1 | 12/2010 | Imamura | |
| 2013/0050494 A1* | 2/2013 | Brouard | H04N 5/23296 |
| | | | 348/149 |

OTHER PUBLICATIONS

English translation of PCT International Search Report for PCT/FR2014/050963, mailed Jul. 11, 2014, 3 pgs.
Results of Earlier Search for FR 1300966, Feb. 5, 2014, 7 pages.

\* cited by examiner

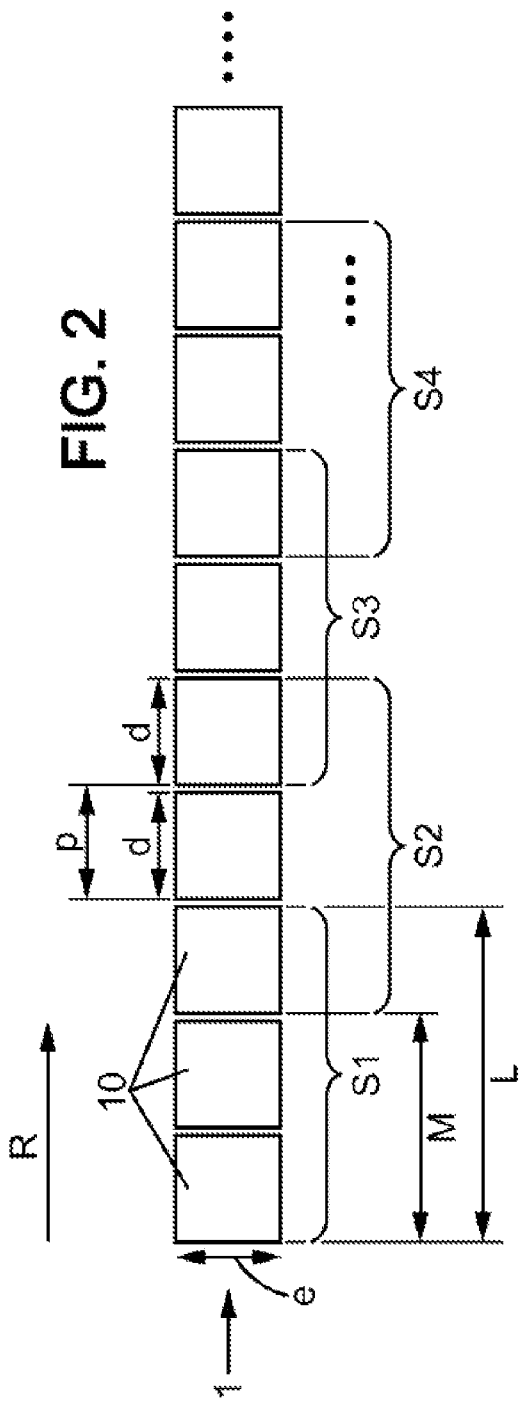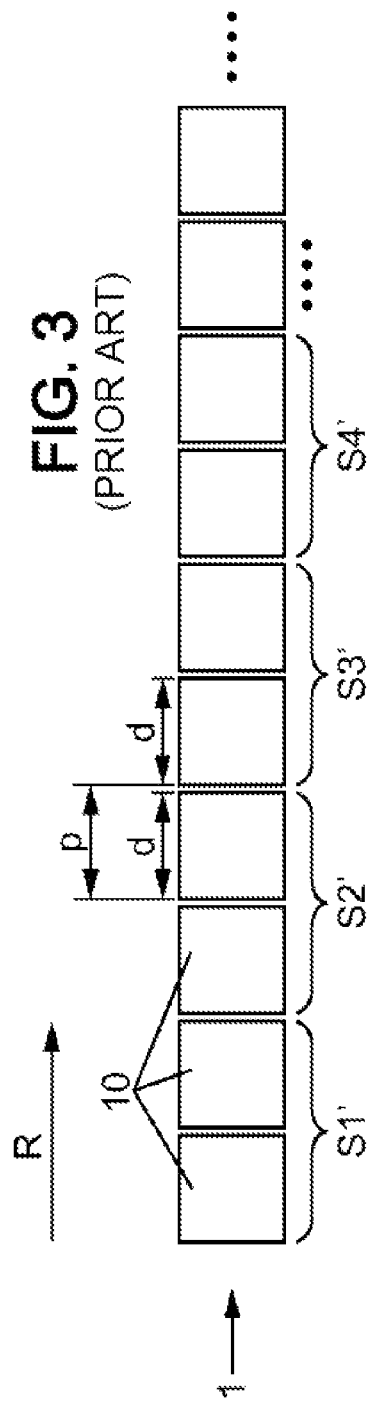

IMAGE CAPTURE WITH ADDITION OF ACCUMULATION SIGNALS FOR ADJACENT PHOTODETECTORS

RELATED APPLICATIONS

The present application is a National Phase entry of PCT Application No. PCT/FR2014/050963, filed Apr. 22, 2014, which claims priority from FR Patent Application No. 13/00966, filed Apr. 25, 2013, said applications being hereby incorporated by reference herein in their entirety.

FIELD OF THE INVENTION

The present invention relates to an image capture instrument in which accumulation signals which are produced by adjacent photodetectors are added together. It also relates to a method which is implemented in such an instrument.

BACKGROUND OF THE INVENTION

The invention aims at improving the quality of the captured images when the image formation and detection conditions generate spectral aliasing, or when the signal-to-noise ratio of the image is insufficient.

A characteristic of an image capture instrument is its modulation transfer function, or MTF. This function characterizes the ability of the instrument to restore, in the captured images, patterns of the image-captured scene which have variable dimensions. Thus, the modulation transfer function is the contrast ratio between the image and the scene, for a pattern having intensity which varies sinusoidally and which is identified by its spatial frequency in the image. The modulation transfer function is obtained by varying the spatial frequency of the pattern, and by determining its contrast in the image as a function of this spatial frequency.

In a known manner, the capture of an image by the instrument has a low-pass filter effect. This effect appears as a decrease in the modulation transfer function as the spatial frequency of the pattern in the image increases.

Several contributions together constitute the modulation transfer function in the form of a product of these contributions, in order to constitute the modulation transfer function of the complete instrument. A first contribution is produced by the image formation optics which are used in the instrument. This first contribution is a decreasing function of the spatial frequency in the image, and is substantially zero for spatial frequencies which are greater than a cut-off frequency $f_C$. This cut-off frequency is given by the following formula: $f_C = 1/(N \cdot \lambda)$, where:

$\lambda$ is a wavelength of the radiation which is used in order to form the image, and which originates from the scene imaged by the instrument, and N is the numerical aperture of the image formation optics: N=f/D, where f and D are, respectively, a focal length and a diameter of the pupil of these optics.

Thus, the spectral components of the scene which would correspond to spatial frequencies in the image which are greater than the cut-off frequency $f_C$, are removed from the image by the optics themselves. In other words, the image of the scene which is formed by the optics contains only spectral components the spatial frequencies of which are less than the cut-off frequency $f_C$.

A second contribution to the modulation transfer function is produced by the image sensor which is used in the instrument. This sensor is situated in the focal plane of the image formation optics, and comprises at least one row of photodetectors which have identical individual dimensions and are aligned with a pitch p which is constant along the row.

In a known manner, such a sensor produces a sampling of the image, with a sampling frequency $f_E$ which is equal to 1/p, when an accumulation signal is read separately in each photodetector in order to constitute a different pixel of the captured image.

When the frequency of sampling $f_E$ by the photodetectors is less than twice the cut-off frequency $f_C$, spectral aliasing occurs because of the level of sampling, which is insufficient. This spectral aliasing relates to the spectral components of the scene having spatial frequencies in the image which are comprised between $f_E/2$ and $f_C$. The intensities of these spectral components appear added to those the spatial frequencies of which are less than $f_E$. The limit constituted by half of the sampling frequency $f_E$ vis-à-vis the ability of the sensor to provide a faithful representation of the spectral components of the image, is called the Nyquist frequency.

When the image sensor is assumed to be perfect, the value of its contribution to the modulation transfer function, for the spatial frequency in the image which is equal to half of the sampling frequency $f_E$, is equal to $\mathrm{sinc}(\pi/2) \approx 0.64$, when each photodetector separately produces an accumulation signal which corresponds to a different image pixel. In the preceding formula, $\mathrm{sinc}(x)$ is the sinus-cardinal function, or $[\sin(x)]/x$ when it is applied to an argument x.

The modulation transfer function which results from the image formation optics and the image sensor then has a value which is still significant for half of the sampling frequency $f_E$. The spectral aliasing then produces artifacts in the captured image, which are visible in particular when this image is merged with another of the same scene but with a sampling frequency which is greater.

A solution for reducing these artifacts consists in reducing the size of the photodetectors in order to reduce their pitch p in the row of the sensor. In this way, the sampling of the image is increased. But the image sensor, with photodetectors which are smaller, is more complex. The data rates to be processed are then greater, which also leads to increased complexity for the data processing chain which is on-board. Moreover, the image sensor which is used can be required because of various constraints, and in particular by other uses of the same sensor when a multi-purpose mission is envisaged. In other words, the individual dimension and the pitch of the photodetectors may be required.

Another solution for reducing the artifacts due to the spectral aliasing consists in reducing the dimension of the pupil of the image formation optics. Thus, the value of the modulation transfer function at half of the sampling frequency is reduced. In this way, the parasitic contribution of the aliased frequencies in the contrasts of the spectral components of the image which have spatial frequencies of less than the sampling frequency, is decreased. However, the image formation optics can be common to several functions. In particular, these optics can be common to several image capture paths which are used simultaneously, for example with intervals which are different for the wavelength of the radiation. The dimension of the pupil of the image formation optics is then fixed, without being possibly adapted separately as a function of the sensor of each imaging path.

Finally, it is also known to vary the effective dimension and the effective pitch of the photodetectors for images which are captured, by "binning" photodetectors which are adjacent along a row of the sensor. To this end, the photodetectors are grouped together in row segments, successive along the row and separate. By "adjacent photodetector binning" is meant a mode for reading the accumulation signals from the photodetectors in which the respective signals from photodetectors which belong to one and the same segment are added together. FIG. 3 illustrates such mode for reading the image sensor, as known before the present invention. In this figure, the reference number 10 denotes the individual photodetectors of the image sensor 1, and S1', S2', S3', S4' etc. denote successive and separate grouping pairs of the photodetectors 10. Consequences of such binning of the photodetectors are in particular:

the spatial sampling frequency of the image is divided by two, which represents a reduction in imaging performance; and the signal-to-noise ratio relative to each intensity value which is used in the image as it is captured, is improved.

Such binning of the photodetectors, which aims at increasing the signal-to-noise ratio by accepting a degradation in the resolution, also gives rise to or worsens the image artifacts which are caused by the spectral aliasing.

SUMMARY OF THE INVENTION

A first object of the invention consists in more efficiently reducing the artifacts which are produced by the spectral aliasing in the images captured.

A second object of the invention is to improve the signal-to-noise ratio for each intensity value which constitutes the captured image.

Finally, complementary objects of the invention are to avoid making the image capture instrument and/or the processing of the captured images too complex, and also avoid increasing the cost price of the instrument. In particular, a complementary object of the invention is to avoid increasing the sampling frequency of the image for a cut-off frequency of the image formation optics which remains constant.

In order to achieve at least one of these objects or others, the present invention proposes an image capture instrument which comprises:

an image formation optics and a row of photodetectors as described previously; and a controller, suitable for controlling readings of the accumulation signals which are produced respectively by the photodetectors.

The controller is moreover suitable for defining a series of segments within the row, which each comprise the same number of adjacent photodetectors, called segment length, and for controlling the readings of the accumulation signals by adding those of which the photodetectors belong to one and the same segment. In other words, the controller is suitable for binning the photodetectors.

The controller is also suitable for defining the segments so that an offset length M between two successive segments in the row, expressed as a number of photodetectors, is constant along the row, and greater than $1/(2 \cdot f_C \cdot p)$. In this way, the instrument has a new sampling frequency $f_E$ for the image which is formed by the optics, equal to $1/(M \cdot p)$. This new sampling frequency $f_E$ is less than twice the cut-off frequency $f_C$. The instrument of the invention therefore operates under conditions such that the spectral aliasing occurs. These characteristics imply that the offset length M is non-zero.

The instrument of the invention also has the following additional characteristic: the segment length is strictly greater than the offset length M, and strictly less than twice this same offset length M.

This additional characteristic generates a reduction in the contribution of the image sensor to the modulation transfer function (MTF) of the instrument. Now, a reduction in the MTF is contrary to what is generally sought by a space optics specialist, who rather aims at increasing it when an improvement in image quality is sought. However, by reducing the contribution of the image sensor to the MTF, the parasitic contribution of the spectral components of the scene which have spatial frequencies aliased in the image captured, is decreased. The image which is captured by binning the photodetectors according to the invention therefore has fewer artifacts caused by spectral aliasing, which would appear in particular when this image is merged with another image having sampling frequency which would be greater.

As a consequence of the invention, two successive segments of photodetectors which are used for adding together the accumulation signals during reading, overlap each other by at least one photodetector. Furthermore, this overlap is smaller than half of the length of each segment.

Moreover, the addition of the accumulation signals for each segment, which produces each intensity value of the captured image, exhibits an improved value for the signal-to-noise ratio. Indeed, the total surface area for collection of the radiation which corresponds to this intensity value, is proportional to the segment length which is used in order to apply the invention.

The invention also proposes an image capture method which comprises the following steps:

providing the image formation optics;

arranging the row of the photodetectors in the focal plane of the image formation optics;

defining the series of segments within the row, which each comprise the same number of adjacent photodetectors, called segment length; and controlling the reading of the accumulation signals which are produced respectively by the photodetectors, by adding those for photodetectors which belong to one and the same segment.

In the method of the invention, an offset length M between two successive segments in the row, expressed as a number of photodetectors, is constant along the row, and greater than $1/(2 \cdot f_C \cdot p)$.

The method of the invention is characterized in that the segment length is strictly greater than the offset length M, and simultaneously strictly less than twice this offset length M.

Now, the contrasts of the spectral components of the image having spatial frequencies which are comprised between the cut-off frequency of the image formation optics and half of this latter, are low in practice, due to the values of the modulation transfer function of the instrument for these spatial frequencies. In this case, and for preferred embodiments of the invention, it may be advantageous that the offset length M between two successive segments in the row is greater than $1/(f_C \cdot p)$. The overlap of two successive segments is therefore smaller. The spatial sampling frequency $f_E$ of the image which is captured is then less than the cut-off frequency $f_C$, in addition to being less than twice $f_C$. The image sensor which is selected for the instrument can thus be less expensive, and the quantity of image data is reduced.

In particular, the offset length M between two successive segments in the row may be comprised between $2/(f_C \cdot p)$ and $10/(f_C \cdot p)$. In this way, the spatial cut-off frequency $f_C$ can be comprised between two times and ten times the spatial sampling frequency $f_E$.

For example, the segment length may be equal to three adjacent photodetectors, and the offset length M between two successive segments in the row may be equal to two adjacent photodetectors.

Generally, the photodetectors to which the invention relates may be elementary photodetectors of an image sensor, or radiation detection units which already result from binning several elementary photodetectors of the image sensor. The term photodetector which is used in the present description covers both these uses of an image sensor.

In preferred implementations of the method of the invention, the addition of the accumulation signals for the photodetectors which belong to one and the same segment when the segment length is strictly greater than the offset length M and strictly less than twice this same offset length M, may correspond to a first reading mode which is available among several alternative reading modes. Then, another series of segments may be defined within the row of the photodetectors, for another one of the reading modes, with the same offset length M between two successive segments as in the first reading mode, but with a new segment length which is equal to the offset length M. Thus, two segments which are successive in the row of photodetectors no longer overlap each other in the other reading mode. The accumulation signals are added together in this other reading mode, for photodetectors which belong to one and the same segment of the other series. In this case, the method may comprise an initial step of selection of one of the reading modes.

Within an image capture instrument according to the invention, the two alternative reading modes can each be defined and controlled by the controller. The image capture instrument is then multi-purpose, and in this way can be suitable for several missions without material modification.

For certain applications of the invention in the field of space imaging, the image formation optics and the row of photodetectors may be parts of an image capture instrument which is mounted on-board a satellite. The method may then be implemented in order to capture at least one image of a portion of the Earth's surface.

BRIEF DESCRIPTION OF THE FIGURES

Other features and advantages of the present invention will become apparent from the following description of non-limitative embodiment examples, with reference to the attached drawings in which:

FIG. 2 shows a reading mode by photodetector binning, as proposed by the present invention; and FIG. 3 shows another reading mode by photodetector binning, known before the present invention.

DETAILED DESCRIPTION OF THE FIGURES

Figure 1:
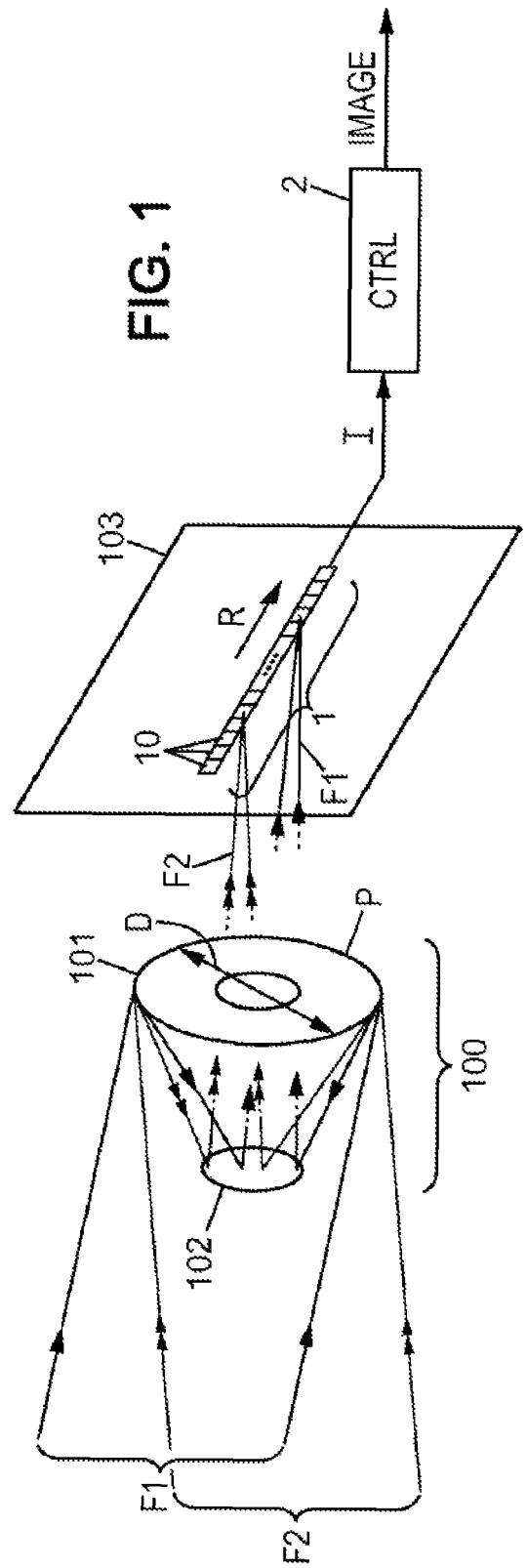
FIG. 1 represents an image capture instrument to which the present invention can be applied.

For reasons of clarity, the dimensions of the components which are represented in these figures correspond neither to actual dimensions nor to ratios between actual dimensions. Moreover, identical references which are contained in different figures denote components which are identical or have identical functions.

According to FIG. 1, an image capture instrument comprises an image formation optics 100, an image sensor 1 and an image capture controller 2. The controller 2 is denoted CTRL and is generally a dedicated electronic unit, separate or not separate from the sensor 1.

The image formation optics 100 can be of any type, based on lenses or mirrors. In particular, it can be suitable for space imaging missions. In this case, the optics 100 can be a telescope of a configuration known to a person skilled in the art, such as a telescope with two mirrors. The references 101 and 102 then denote, respectively, the primary mirror and the secondary mirror of the telescope. In a known manner, the aperture for the radiation beams which enter the optics 100 is limited by the pupil P of these optics, the diameter of which is denoted D. In the case of a telescope, the entrance pupil corresponds most often to the peripheral limit of the primary mirror 101.

The image formation optics 100 have a cut-off frequency $f_C$ which is effective for the spectral components of the image formed, as a function of the spatial frequency of these components. The expression of this cut-off frequency $f_C$ was referred to at the start of the present description.

The photosensitive surface of the image sensor 1 is situated in the image formation plane 103 of the optics 100, which corresponds most often to the focal plane of this latter. Thus, radiation beams F1 and F2 which originate from different points in a scene which is situated in the field of view of the optics 100, converge at separate areas of the photosensitive surface of the sensor 1.

The image sensor 1 can be any type of matrix sensor, in-line sensor or time delay integration (TDI) sensor. The sensor 1 then comprises at least one row of photodetectors 10, which are juxtaposed in a row direction denoted R. The row can contain 3500 photodetectors 10, for example. In order to capture an image, each photodetector 10 individually produces an accumulation signal which is denoted 1, and which is proportional to a quantity of radiation received by this photodetector during a determined exposure time. Hereinafter, but non-limitatively, the sensor 1 can be considered to be an in-line sensor, i.e. constituted by a single row of photodetectors.

Finally, the controller 2 controls the operation of the sensor 1 in order to capture each image. In addition to the step of exposure of each photodetector 10, it controls a step of reading the accumulation signals I. The image sensor 1 and the controller 2 can be adapted in order to capture the images according to different modes of operation, such as the simultaneous exposure of all the photodetectors 10, referred to as a "snapshot", or a continuous reading mode of the photodetectors, denoted "rolling". But preferably, the image sensor 1 and the controller 2 are suitable for combining the invention with an image capture mode of the "pushbroom". type A person skilled in the art will understand that the invention which is described hereinafter can be combined with a great variety of modes of operation for the image sensor 1. The controller 2 outputs an image which is constructed by assigning intensity values respectively to discrete pixels in an image frame.

In a reference image capture method, each pixel in the image frame can correspond to a single one of the photodetectors 10, so that the respective intensity values of the pixels of the captured image have a one-to-one correspondence with the accumulation signals I which are read separately in the photodetectors 10. The imaging characteristics which are then obtained depend on those of the image formation optics 100 and the image sensor 1. These characteristics comprise in particular:

the cut-off frequency $f_C$ of the optics 100;

the individual dimension d of the photodetectors 10 in the direction R. More precisely, d is the dimension of the portion of photosensitive surface of the image sensor 1, which corresponds to a single photodetector; and the pitch p of the photodetectors 10 in the direction R, defined as the distance in this direction between two edges on one and the same side, relative to two photodetectors 10 which are adjacent within the row. In other words, the pitch p is the spatial period of the photodetectors 10 in the photosensitive surface of the sensor 1, in the direction R.

The gap between the pitch p and the dimension d is the width of a dead band which exists between two photodetectors 10 which are adjacent in the row. This gap is ignored hereinafter, but a person skilled in the art will be able to take it into account if necessary on reading the explanations given below.

The precise numerical values of these characteristics have no significance with respect to the principle of the invention, and depend on the actual components which are selected in order to constitute the image capture instrument. Similarly, the dimension e of the photodetectors 10, measured perpendicular to the direction R, has no significance with respect to the invention.

The image capture methods according to the invention implement binning of the photodetectors 10. Some of the imaging characteristics presented, including the contribution of the sensor 1 to the modulation transfer function and the sampling frequency, then depend, moreover, on the binning pattern which is used.

However, the contribution of the image formation optics 100 to the modulation transfer function of the instrument, called first contribution above, is not modified. Consequently, the cut-off frequency $f_C$ of the optics 100 is unchanged.

FIG. 2 shows a particular implementation of the invention. The photodetectors 10 there are grouped together in continuous segments in the direction R, with a segment length L which is common to all the segments, and an offset length M between two successive segments in the direction R, which is also constant. The successive segments are denoted S1, S2, S3, S4 . . . , for example starting from one end of the row of the photodetectors 10. The lengths M and L are obviously each greater than or equal to unity, i.e. each greater than a single photodetector.

The invention introduces the following condition: M<L<2·M. In other words, the offset length M is less than the segment length L, and greater than half this same segment length L.

The first inequality (M<L) expresses the fact that two successive segments in the row overlap one another, i.e. they have at least one photodetector 10 in common.

The second inequality (M>L/2) expresses the fact that this overlap between two successive segments is shorter than half of the length of each segment.

In the example which is represented in FIG. 2, the length L of each segment S1, S2, S3, S4 . . . is equal to three times the pitch p, corresponding to segments which are each constituted by three successive photodetectors 10. The offset length M is equal to twice the pitch p, corresponding to successive segments which are offset from each other by two successive photodetectors 10. Consequently, two successive segments have an overlap which has the length L−M in the direction R, i.e. an overlap of one photodetector 10 in the example represented.

The controller 2 then carries out an addition of the accumulation signals I for the photodetectors 10 which belong to one and the same segment S1, S2, S3, S4 . . . . Thus, a first intensity value $I_1$ is obtained from the sum of the respective accumulation signals I from the three photodetectors 10 in the respective segment S1, a second intensity value $I_2$ is obtained from the sum of the respective accumulation signals I from the three photodetectors 10 in the segment S2, a third intensity value $I_3$ is obtained from the sum of the respective accumulation signals I from the three photodetectors 10 in the segment S3, etc. Such an addition of the accumulation signals I within each segment S1, S2, S3, S4 . . . can be carried out in any way accessible to a person skilled in the art: materially at the level of the readout circuits of the sensor 1, by means of the software within the controller 2, on analogue signals, and also on digital signals. The image which is outputted by the controller 2 is constructed by assigning the intensity values $I_1, I_2, I_3$ . . . to different pixels in the image frame.

The offset length then replaces the pitch p of the individual photodetectors 10 in the row 1, for the sampling which is thus carried out within the image formed by the optics 100. In other words, the sampling frequency of the instrument is then: $f_E=1/(M \cdot p)$. In the particular example of FIG. 2, the sampling frequency $f_E$ is thus divided by two, with respect to the reference image capture method which was referred to above.

The invention is of benefit when the offset length M is selected in order to also comply with the inequality $M>1/(2 \cdot f_C \cdot p)$. Then, the sampling frequency $f_E$ is smaller than twice the cut-off frequency $f_C$ of the optics 100: $f_E<2 \cdot f_C$. The invention therefore relates to image sampling conditions under which spectral aliasing occurs and is capable of producing artifacts in the sampled image which is captured.

The contribution to the modulation transfer function which is due to the image sensor 1, called second contribution in the general part of the description, and assessed for the spatial frequency in the image which is equal to half of $f_E$ the sampling frequency $f_E$, becomes sinc $[\pi L/(2 \cdot M)]$ by applying the invention. Given that M<L<2·M, this value is comprised strictly between zero and sinc($\pi/2$)≈0.64. In other words, the modulation transfer function assessed for half of the sampling frequency $f_E$, is reduced with respect to the reference method where the accumulation signals I from the photodetectors 10 are assigned one-to-one to the pixels in the image frame. The spectral components of the image which are aliased therefore have contrast values which are reduced, with the result that the image which is constructed from the intensity values $I_1, I_2, I_3$ . . . exhibits artifacts due to spectral aliasing which are reduced.

For the example with L=3 photodetectors and M=2 photodetectors, the contribution to the modulation transfer function which is due to the image sensor 1, at half of the sampling frequency $f_E$, is equal to sinc($\pi \cdot 3/4$)≈0.30.

In practice, the spectral components of the image having spatial frequencies which are comprised between half of the cut-off frequency $f_C$ and this cut-off frequency $f_C$ itself, have contrast values which are reduced. Indeed, the values of the modulation transfer function are low for these spatial frequencies. The artifacts which are due to the spectral aliasing from this interval of spatial frequencies are therefore minor, so that the sampling frequency $f_E$ can be less than the cut-off frequency $f_C$, besides being less than twice $f_C$, whilst obtaining a captured image devoid of artifacts which are significant. I.e.: $f_E<f_C$, or $M>1/(f_C \cdot p)$. The overlap of two successive segments of photodetectors 10 can therefore be reduced whilst applying the invention.

For example, the offset length M can be selected equal to $8/(f_C \cdot p)$. In this case, the sampling frequency $f_E$ is equal to only ⅛ of the cut-off frequency $f_C$.

Another advantage results from the increase in the effective radiation collection surface, which is associated with each intensity value of the image. This effective collection surface is multiplied by the number of the photodetectors 10 which are grouped together by segment, i.e. by the segment length L. As a result, the total accumulation signal which is associated with each segment S1, S2, S3, S4 . . . , is multiplied by L, on average, whereas the level of photonic noise is simultaneously multiplied only by the square root of L. The signal-to-noise ratio which is associated with each intensity value of the captured image is thus itself increased by a multiplication factor equal to the square root of L, which is greater than unity. This results in an improvement in the signal-to-noise ratio of the captured image.

By way of comparison, FIG. 3 shows a reading mode of the image sensor 1, which involves binning adjacent photodetectors in separate successive segments, for example in separate pairs of successive photodetectors. In other words, the segment length and the offset length between two successive segments are equal: M=L, for example both equal to two photodetectors 10. This reading mode does not therefore use the present invention. S1', S2', S3', S4' . . . denote the new segments which are thus defined in the row of the photodetectors 10 of the sensor 1, instead of the segments S1, S2, S3, S4 . . . . The sampling frequency of the reading mode of FIG. 3 is twice as low as that of the reading mode of FIG. 2, and the contribution of the sensor 1 to the modulation transfer function for half of the sampling frequency, is again equal to ≈0.64 in the case of FIG. 3, instead of ≈0.3 in the case of FIG. 2. For these reasons, the reading mode of FIG. 2, which is in accordance with the present invention, produces fewer artifacts in the image which is finally captured.

Moreover, the value of the signal-to-noise ratio is also lower for the reading mode of FIG. 2, in comparison with that of FIG. 3, by a factor equal to $(3/2)^{1/2} \approx 1.22$.

However, the two reading modes of FIGS. 2 and 3 correspond to quantities of image data which are identical.

In multi-purpose embodiments of the invention, the two reading modes of the image sensor, according to FIGS. 2 and 3 respectively, can be selected alternately at will, depending on the imaging mission concerned. Such a selection can be carried out by an appropriate command which is sent to the controller 2, for example.

It is understood that the invention as it has just been described can be adapted or modified in its implementation details whilst retaining at least some of the advantages which have been mentioned. In particular, the segment L and offset M lengths between two successive segments can be increased, but nevertheless the segment length L remains strictly comprised between the offset length and twice this latter, for the application of the invention.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. An image capture instrument, comprising:
   an image formation optics, suitable for forming an image of a scene in a focal plane from a radiation originating from said scene, the image formation optics having a pupil of diameter D and a focal length f determining a numerical aperture N and a spatial cut-off frequency $f_C$ effective for patterns in the image, according to the formula:

$$N = f/D \text{ and } f_C = 1/(N \cdot \lambda),$$

where λ is a wavelength of the radiation;
   a row of photodetectors situated in the focal plane, with a pitch p of the photodetectors which is constant along the row; and
   a controller suitable for controlling readings of accumulation signals produced respectively by the photodetectors,
   the controller defining a series of segments within the row, which each comprise one same number of adjacent photodetectors, called a segment length, and for controlling the readings of the accumulation signals by adding together said accumulation signals for photodetectors which belong to one and the same segment,
   the controller further defining the segments so that an offset length M between two successive segments in the row, expressed as a number of photodetectors, is constant along the row, and greater than $1/(2 \cdot f_C \cdot p)$,
   wherein the instrument being characterized in that the segment length is greater than the offset length M, and less than twice said offset length M.

2. The instrument according to claim 1, in which the segment length is equal to three adjacent photodetectors, and the offset length M between two successive segments in the row is equal to two adjacent photodetectors.

3. The instrument according to claim 1, in which the offset length M between two successive segments, in the row, is greater than $1/(f_C \cdot p)$.

4. The instrument according to claim 3, in which the offset length M between two successive segments in the row, is comprised between $2/(f_C \cdot p)$ and $10/(f_C \cdot p)$.

5. The instrument according to claim 1, in which the controller is suitable for controlling readings of the accumulation signals according to several alternative reading modes,
   the addition of the accumulation signals for the photodetectors which belong to one and the same segment when the segment length is greater than the offset length M and strictly less than twice said offset length M, corresponding to a first one of the reading modes, and
   the controller, in another of the reading modes, further defining another series of segments within the row of the photodetectors, with the same offset length M between two successive segments as in the first reading mode, but with a new segment length which is equal to said offset length M, and for adding together the accumulation signals for photodetectors which belong to one and the same segment of said other series.

6. An image capture method, comprising the following steps:

providing an image formation optics, suitable for forming an image of a scene in a focal plane from radiation originating from said scene, the image formation optics having a pupil of diameter D and a focal length f determining a numerical aperture N and a spatial cut-off frequency $f_C$ effective for patterns in the image, according to the formulae:

$$N = f/D \text{ and } f_C = 1/(N \cdot \lambda)$$

where $\lambda$ is a wavelength of the radiation;

in the focal plane, arranging a row of photodetectors with a pitch p of the photodetectors which is constant along said row;

defining a series of segments within the row, which each comprise one same number of adjacent photodetectors, called segment length; and controlling a reading of accumulation signals produced respectively by the photodetectors (10), by adding together the accumulation signals from the photodetectors which belong to one and the same segment, an offset length M between two successive segments in the row, expressed as a number of photodetectors being constant along the row, and greater than $1/(2 \cdot f_C \cdot p)$, the method further characterized in that the segment length is greater than the offset length M, and less than twice said offset length M.

7. Method according to claim 6, wherein the segment length is equal to three adjacent photodetectors, and the offset length M between two successive segments in the row is equal to two adjacent photodetectors.

8. The method according to claim 6, wherein the offset length M between two successive segments in the row, is greater than $1/(f_C \cdot p)$.

9. The method according to claim 6, wherein the offset length M between two successive segments in the row, is comprised between $2/(f_C \cdot p)$ and $10/(f_C \cdot p)$.

10. The method according to claim 1, wherein the addition of the accumulation signals for the photodetectors which belong to one and the same segment when the segment length is greater than the offset length M and less than twice said offset length M, corresponds to a first reading mode among several alternative reading modes, and in another one of the reading modes, another series of segments is defined within the row of the photodetectors, with the same offset length M between two successive segments as in the first reading mode, but with a new segment length which is equal to said offset length M, and the accumulation signals are added together for photodetectors which belong to one and the same segment of said other series, the method further comprising an initial stop of selecting of one of the reading modes.

11. The method according to claim 6, wherein the image formation optics and the row of the photodetectors are parts of an image capture instrument, said instrument is mounted on-board a satellite, and the method is implemented in order to capture at least one image of a portion of the Earth's surface.

* * * * *